United States Patent [19]
Gill

[11] Patent Number: 5,909,344
[45] Date of Patent: *Jun. 1, 1999

[54] MAGNETORESISTIVE SENSOR WITH HIGH RESISTIVITY FLUX GUIDE

[75] Inventor: Hardayal Singh Gill, Portola Valley, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/565,538

[22] Filed: Nov. 30, 1995

[51] Int. Cl.⁶ ..................................................... G11B 5/39
[52] U.S. Cl. ............................................................ 360/113
[58] Field of Search .................................. 360/113, 110, 360/126; 324/252; 338/32 R

[56] References Cited

U.S. PATENT DOCUMENTS

| | | | |
|---|---|---|---|
| 3,908,194 | 9/1975 | Romankin | 360/113 |
| 4,843,506 | 6/1989 | Gill et al. | 360/113 |
| 5,469,317 | 11/1995 | Nagata et al. | 360/113 |
| 5,493,467 | 2/1996 | Cain et al. | 360/113 |
| 5,508,868 | 4/1996 | Cheng et al. | 360/113 |
| 5,510,941 | 4/1996 | Ohyama et al. | 360/113 |
| 5,617,276 | 4/1997 | Takada et al. | 360/113 |
| 5,696,656 | 12/1997 | Gill et al. | 360/113 |

FOREIGN PATENT DOCUMENTS

| | | |
|---|---|---|
| 60-21351 | 2/1985 | Japan . |
| 61-39916 | 2/1986 | Japan . |
| 61-237218 | 10/1986 | Japan . |
| 63-270440 | 11/1988 | Japan . |
| 2-151088 | 6/1990 | Japan . |
| 3-268216 | 11/1991 | Japan . |
| 5217746 | 8/1993 | Japan . |
| 8-138212 | 5/1996 | Japan . |

*Primary Examiner*—David L. Ometz
*Attorney, Agent, or Firm*—Paik Saber

[57] ABSTRACT

A magnetoresistive read sensor having an MR sensing element in parallel with a flux guide. The flux guide is made of an amorphous alloy having a composition of $Co_aHf_bNb_c$ where a is the concentration of Co, b is the concentration of Hf, and c is the concentration of Nb. $Co_aHf_bNb_c$ has a high magnetization and is highly resistive which reduces the amount of sense current flowing through the flux guide, thus increasing the amplitude of the signal sensed by the MR sensing element.

18 Claims, 9 Drawing Sheets

$$\Delta V = I \Delta R_1 \left( \underbrace{\frac{R_2}{R_1 + R_2}}_{\text{SHUNT FACTOR}} \right)$$

MAGNETORESISTIVE SENSOR WITH HIGH RESISTIVITY FLUX GUIDE

BACKGROUND OF THE INVENTION

1. Technical Field

This invention relates in general to a magnetoresistive read sensor for reading signals from a magnetic medium and, more particularly, to an improved magnetoresistive read sensor comprising a high resistivity flux guide.

2. Description of the Background Art

A magnetoresistive (MR) read sensor has been shown to be capable of reading data from a magnetic surface of a magnetic disk at great linear densities. An MR sensor detects magnetic fields through the resistance changes of its MR sensing element (also referred to as "MR layer") as a function of the strength and direction of magnetic flux being sensed by the MR sensing element. MR read sensors are of great interest for several reasons: MR sensors' intrinsic noise is lower than inductive sensors' intrinsic noise, thus providing improved signal-to-noise (S/N) performance; MR sensors sense magnetic flux ($\phi$) as compared to inductive heads which sense the time rate of change of flux, $d\phi/dt$, thus making the reproduction of the signal recorded on a medium independent of the relative velocity between the MR sensor and medium; and MR sensors have bandwidth in the gigahertz (gHz) range which allows areal storage density well in excess of one gigabit per square inch.

MR sensors currently being used or under development fall into two broad categories: 1) anisotropic magnetoresistive (AMR) sensors and 2) giant magnetoresistive (GMR) sensors. In the AMR sensors, the resistance of the MR layer varies as the function of $\cos^2\alpha$ where $\alpha$ is the angle between the magnetization and the direction of the sense current flowing in the MR layer. The MR layer is made of ferromagnetic material. U.S. Pat. No. 5,018,037 entitled "Magnetoresistive Read Transducer Having Hard Magnetic Bias", granted to Krounbi et al. on May 21, 1991, discloses an MR sensors operating on the basis of the AMR effect. In the GMR sensor, the resistance of the MR sensing element varies as a function of the spin-dependent transmission of the conduction electrons between the magnetic layers separated by a non-magnetic layer and the accompanying spin-dependent scattering which takes place at the interface of the magnetic and non-magnetic layers and within the magnetic layers. GMR sensors using only two layers of ferromagnetic material separated by a layer of non-magnetic electrically conductive material are generally referred to as spin valve (SV) MR sensors. A GMR sensor fabricated from the appropriate materials provides improved sensitivity and greater change in resistance than observed in sensors using the AMR effect. U.S. Pat. No. 5,206,590 entitled "Magnetoresistive Sensor Based On The Spin Valve Effect", granted to Dieny et al. on Apr. 27, 1993, discloses an MR sensors operating on the basis of the spin valve effect.

There are several problems associated with the use of the MR sensors which require inventive solutions; for example, MR sensors, especially spin valve MR sensors, typically utilize materials such as copper (Cu), cobalt (Co) or nickel iron (NiFe) in order to form the magnetic layer or layers of the sensing element. The presence of these material at the head/disk interface can cause head failure due to the head corrosion. Furthermore, in near contact recording applications, the presence of an MR sensor at the head/disk interface can lead to failure of the head due to mechanical and/or thermal phenomena such as thermal asperity. Thermal asperity can cause severe mechanical and thermal damages to the MR sensor. Furthermore, since the performance of MR sensors are dependent on the size of their sensing elements, it is critical to control the size of the sensing elements during the lapping process as much as possible. However, mechanical lapping processes currently used to lap MR sensors have substantial manufacturing tolerances. As a result, it is extremely difficult to precisely control the size of MR sensors' sensing elements.

In order to substantially eliminate these aforementioned problems, it has been suggested to place a flux guide between the MR sensing element and the air bearing surface (air bearing surface (ABS) refers to the surface of the slider adjacent to the surface of the magnetic disk). A flux guide is generally made of magnetic material which is noncorrosive or less corrosive than the magnetic material used in forming the MR layer(s). It can also be made of magnetic material having a higher permeability than the MR layer(s). Placing a flux guide between the MR sensing element and the air bearing surface eliminates the corrosion problem; eliminates mechanical and/or thermal problems in near contact recording; and eliminates the sensitivity of the MR sensor to the lapping process because what gets lapped during the lapping process is the flux guide as opposed to the MR sensing element.

Figure 1A:
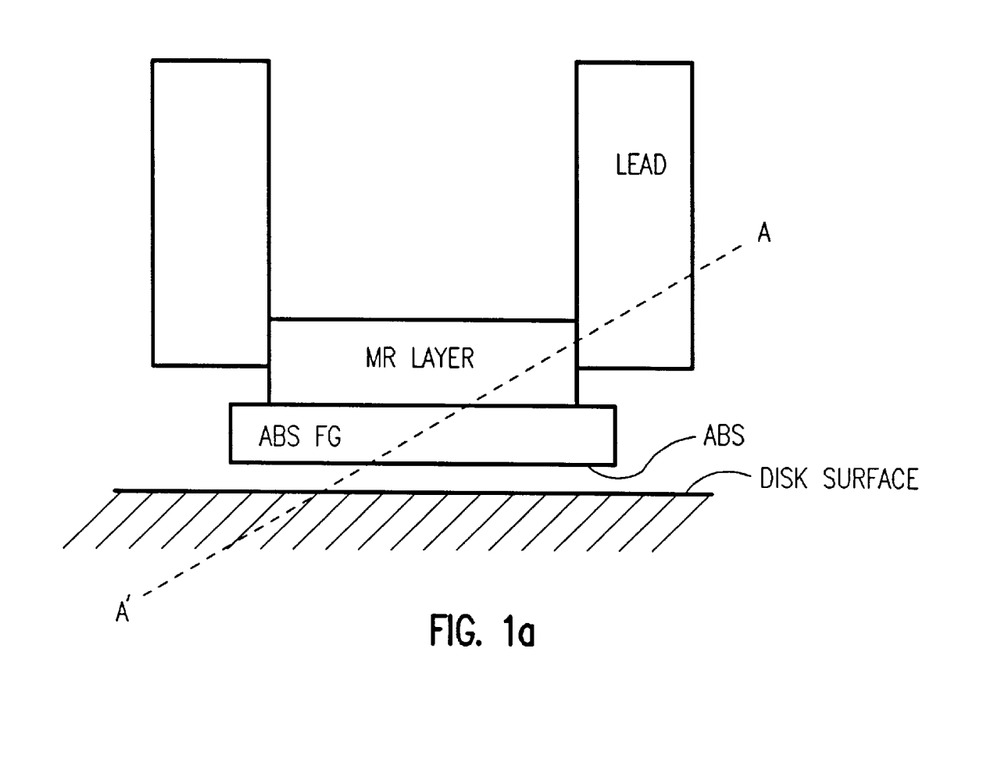
FIGS. 1A and 1B are a top view and a side view, respectively, of an MR sensor having a flux guide in parallel with the MR sensor sensing element.
Figure 1B:
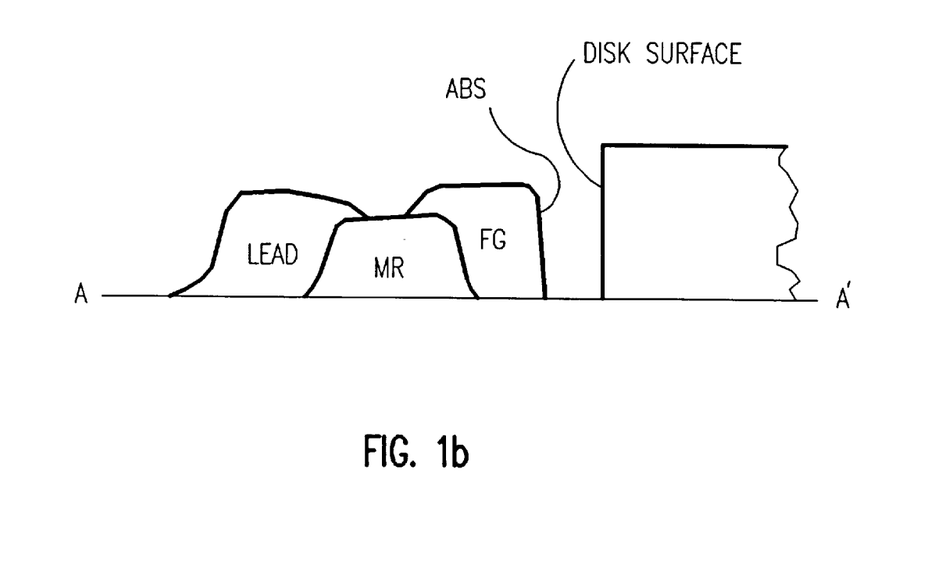

In one approach as shown in FIGS. 1A and 1B, the flux guide is placed between the MR sensing element and the air bearing surface (referred to as "ABS Flux Guide" and/or "Front Flux Guide" or simply "Flux Guide"). However, since the front flux guide forms a resistor in parallel with the MR layer, a substantial amount of the sense current which is meant to flow in the MR layer ends up flowing in the front flux guide (this is referred to as flux guide shunting the sense current). For example, a 250 angstrom (Å) thick NiFe flux guide shunts about 60% of the sense current away from the MR layer thus seriously reducing the sense current through the MR layer which reduces the MR sensor's sensitivity.

Figure 2A:
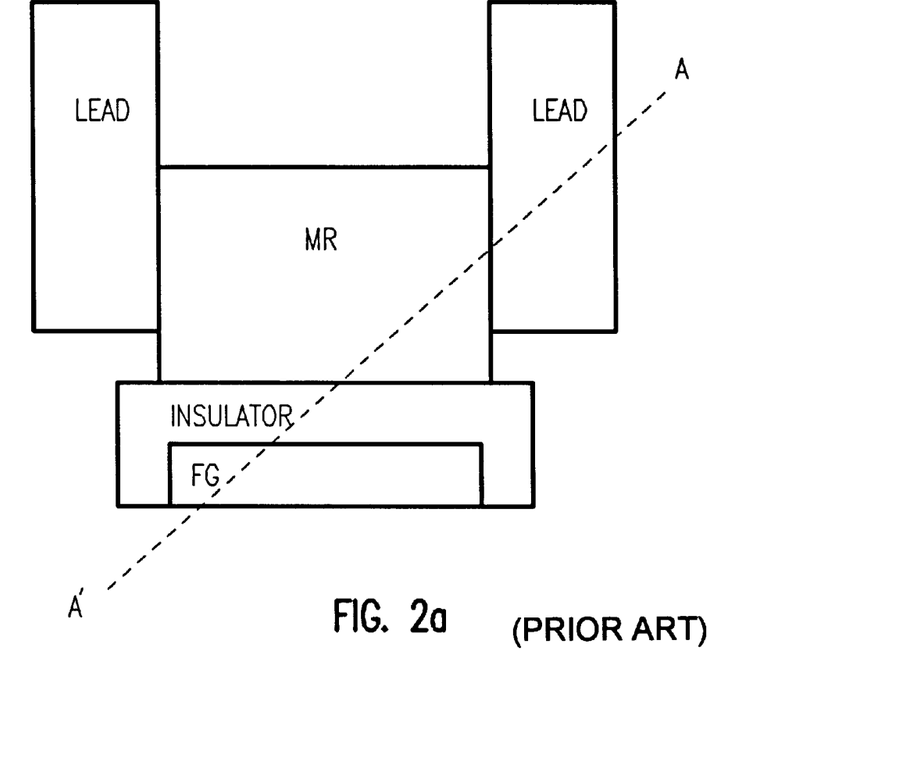
FIGS. 2A and 2B are a top view and a side view, respectively, of another MR sensor having a flux guide separated from the MR sensing element by an insulator.
Figure 2B:
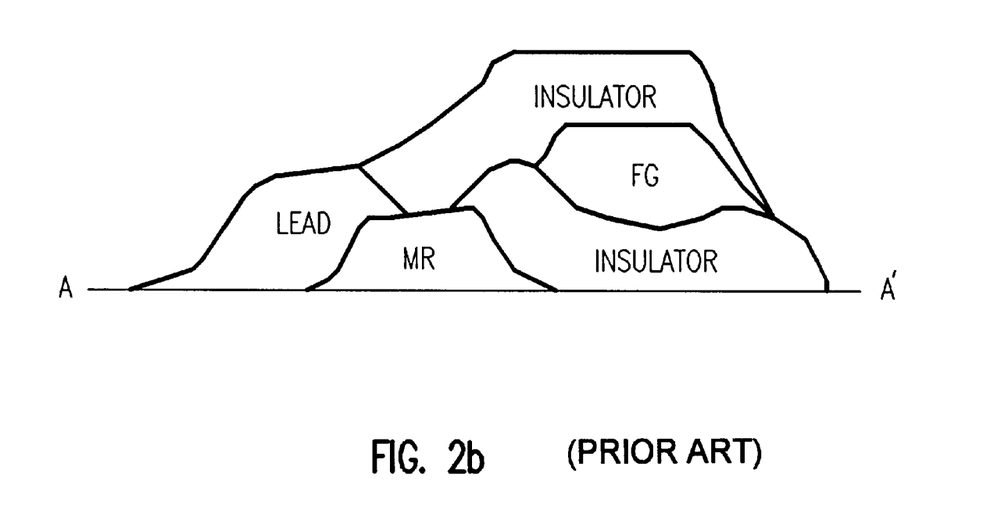

One possible way to avoid the shunting effect is to insulate the flux guide from the MR sensing element using insulating material such as $Al_2O_3$ or $SiO_2$ as shown in FIGS. 2A and 2B. However, the use of an insulating layer reduces the sensing efficiency of the MR sensor for reading signals recorded on a magnetic disk. For example, it can be shown that the sensing efficiency of a spin valve MR sensor is lowered by about 30% for even a 200 Å thick insulator material placed between the flux guide and the MR sensing element. Furthermore, using an insulator to insulate the MR sensing element from the flux guide adds to the number of processing steps, thus lowering the overall yield for producing MR sensors. Moreover, a second insulator has to also be added between the flux guide and the MR sensor leads to ensure insulation between the flux guide and the leads. (As shown in FIG. 2B). Furthermore, since the performance of the spin valve MR sensors are very sensitive to high temperature fabrication process, temperatures in excess of 200° C. can permanently degrade magnetoresistance of the spin valve MR sensor by up to 50%. Therefore, a flux guide material is required which could be fabricated below 200° C.

Therefore, there is a need for an invention which teaches how to use the flux guide to protect the MR sensor against corrosion, mechanical and thermal problems, performance degradation due to high temperature fabrication process, performance degradation due to manufacturing tolerances in lapping process, and at the same time to avoid sense current shunting problems created by the use of the flux guide.

SUMMARY OF THE INVENTION

It is therefore an object of the present invention to disclose an MR sensor which is corrosion resistant.

It is another object of the present invention to disclose an MR sensor having a flux guide.

It is yet another object of the present invention to disclose an MR sensor having a flux guide where the amount of the sense current shunted by the flux guide is negligible.

It is still another object of the present invention to disclose an MR sensor which is independent of the lapping process manufacturing variations.

It is yet another object of the present invention to disclose a spin valve MR sensor having a flux guide where the flux guide is added to the MR sensor without the use of a high temperature fabrication processing step.

These and other objects and advantages are attained in accordance with the principles of the present invention by an MR read sensor (AMR or GMR) having a MR sensing element in parallel with a high resistivity flux guide. The flux guide is made of an amorphous alloy which comprises the composition $Co_aHf_bNb_c$ known as cobalt-hafnium-niobium where a is the concentration of Co, b is the concentration of Hf, and c is the concentration of Nb. Furthermore, $80<a<96$, $4<b+c<20$, and $a+b+c=100$. $Co_aHf_bNb_c$ has shown to have an extremely high resistivity, a very high magnetization, low coercivity, high permeability, and requires a low temperature process (less than 200° C.) for deposition.

In another embodiment, the MR sensor (AMR or GMR) comprises a high resistivity flux guide placed in parallel with the MR sensing element where the flux guide is made of an amorphous alloy comprising the composition $Co_aFe_bNb_c$ known as cobalt-iron-niobium where a is the concentration of Co, b is the concentration of Fe, and c is the concentration of Nb. Furthermore, $80<a<96$, $4<b+c<20$, and $a+b+c=100$. $Co_aFe_bNb_c$ has also been shown to have an extremely high resistivity, very high magnetization, low coercivity, high permeability and requires a low temperatures (less than 200° C.) process for deposition.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DESCRIPTION OF THE PREFERRED EMBODIMENT

The following description is the best mode presently contemplated for carrying out the invention. This description and the number of alternative embodiments shown are made for the purpose of illustrating the general principle of the present invention and is not meant to limit the inventive concepts claimed herein.

Figure 3:
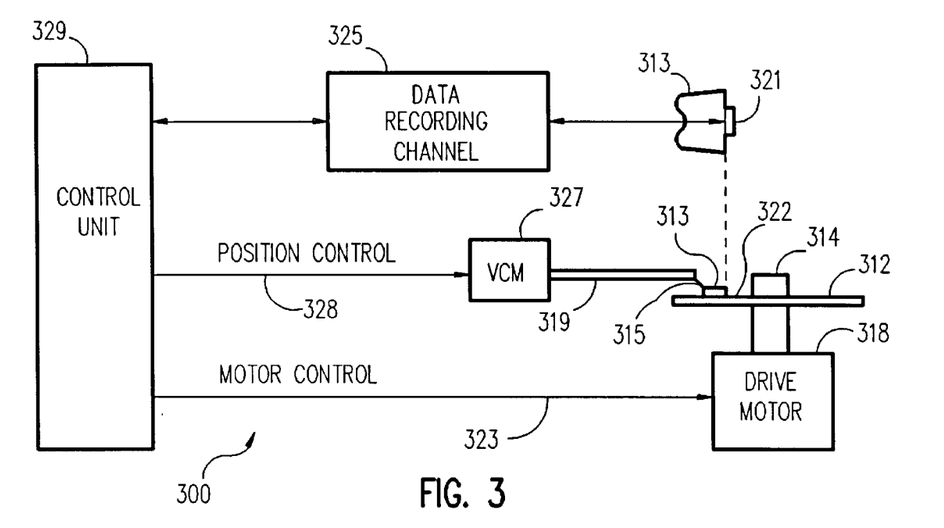
FIG. 3 is a simplified block diagram of a magnetic disk storage system embodying the present invention.

Referring now to FIG. 3, although the invention is described as embodied in a magnetic disk storage system as shown in FIG. 3, it will be apparent that the invention is also applicable to other magnetic recording systems such as a magnetic tape recording system. At least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write transducers 321, typically referred to as read/write heads. As the disks rotate, sliders 313 are moved radially in and out over disk surface 322 so that heads 321 may access different portions of the disk where desired data is recorded. Each slider 313 is attached to an actuator arm 319 by means of a suspension 315. The suspension 315 provides a slight spring force which biases slider 313 against disk surface 322. Each actuator arm 319 is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position a selected slider 313 to the desired data track on disk 312. Read and write signals are communicated to and from read/write heads 321 by means of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4A:
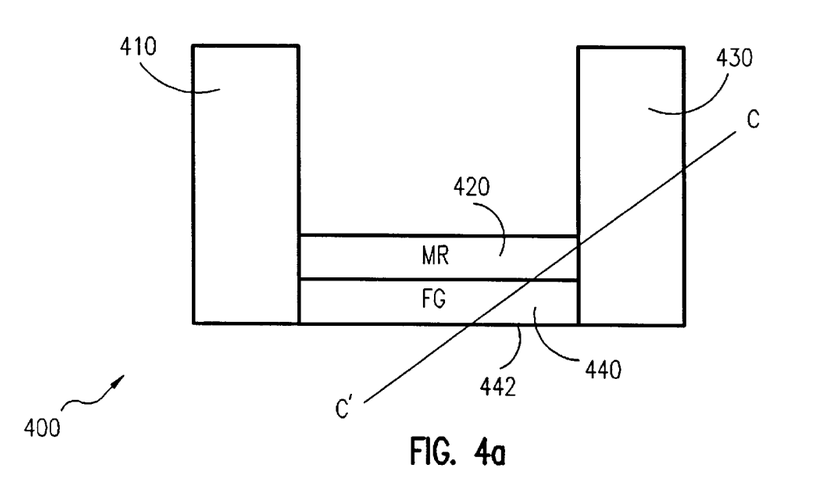
FIGS. 4A, 4B and 4C are a top view, front view, and side view, respectively, of the MR sensor of the present invention showing a high resistivity flux guide in parallel with the MR sensor sensing element.
Figure 4B:
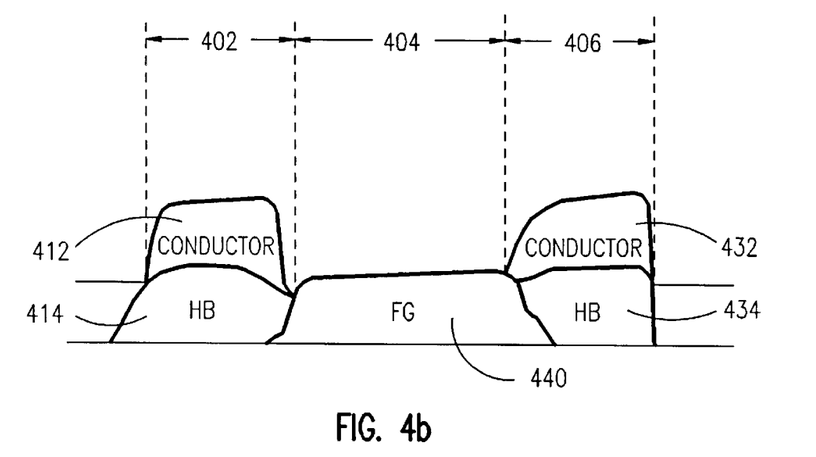
Figure 4C:
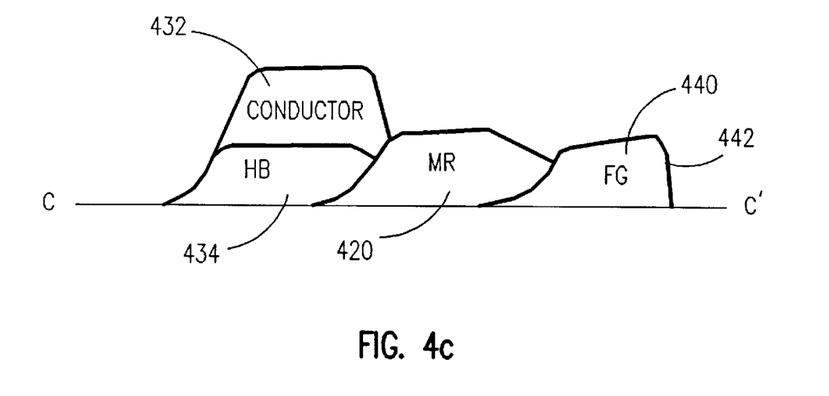

Now referring to FIGS. 4A, 4B and 4C, there is shown the top view, front view, and side view along the line CC' of MR sensor 400 of the preferred embodiment of the present invention. MR sensor 400 comprises passive end regions 402 and 406 separated by a central active region 404. MR sensing element 420 is formed substantially over the central active region followed by forming front flux guide 440 in parallel with MR sensing element 420. Flux guide 440 further has a track-width edge 442. In the preferred embodiment of the present invention, the layers forming MR sensing element 420 are chosen such that MR sensor 400 is a spin valve MR sensor. End region 402 comprises a lead material 410 where lead material 410 further comprises a longitudinal bias material 414 and a conducting material 412. Likewise, end region 406 comprises a lead material 430 where lead material 430 further comprises a longitudinal bias material 434 and a conducting material 432.

In the preferred embodiment of the present invention, flux guide 440, which is formed in parallel with MR sensing element 420, comprises an amorphous alloy having a composition of $Co_{87}Hf_2Nb_{11}$. The pertinent magnetic and electrical properties of this amorphous alloy is summarized in Table 1. Table 1 also shows the magnetic and electrical properties of nickel iron (NiFe) which is a conventional flux guide material.

TABLE 1

|  | The Invention | Conventional Material |
| --- | --- | --- |
| Flux guide composition | $Co_{87}Hf_2Nb_{11}$ | NiFe |
| P (resistivity, $\mu\Omega$ cm) | 120 | 20 |
| M (magnetization, emu/cm$^3$) | 1035 | 800 |
| Hc (coercivity, Oe) | 3 | 3 |

As shown in Table 1, the amorphous alloy having the composition $Co_{87}Hf_2Nb_{11}$ of the present invention has a resistivity which is about six times larger than the resistivity of NiFe and has a magnetization which is about 30% larger than the magnetization of NiFe.

Figure 6:
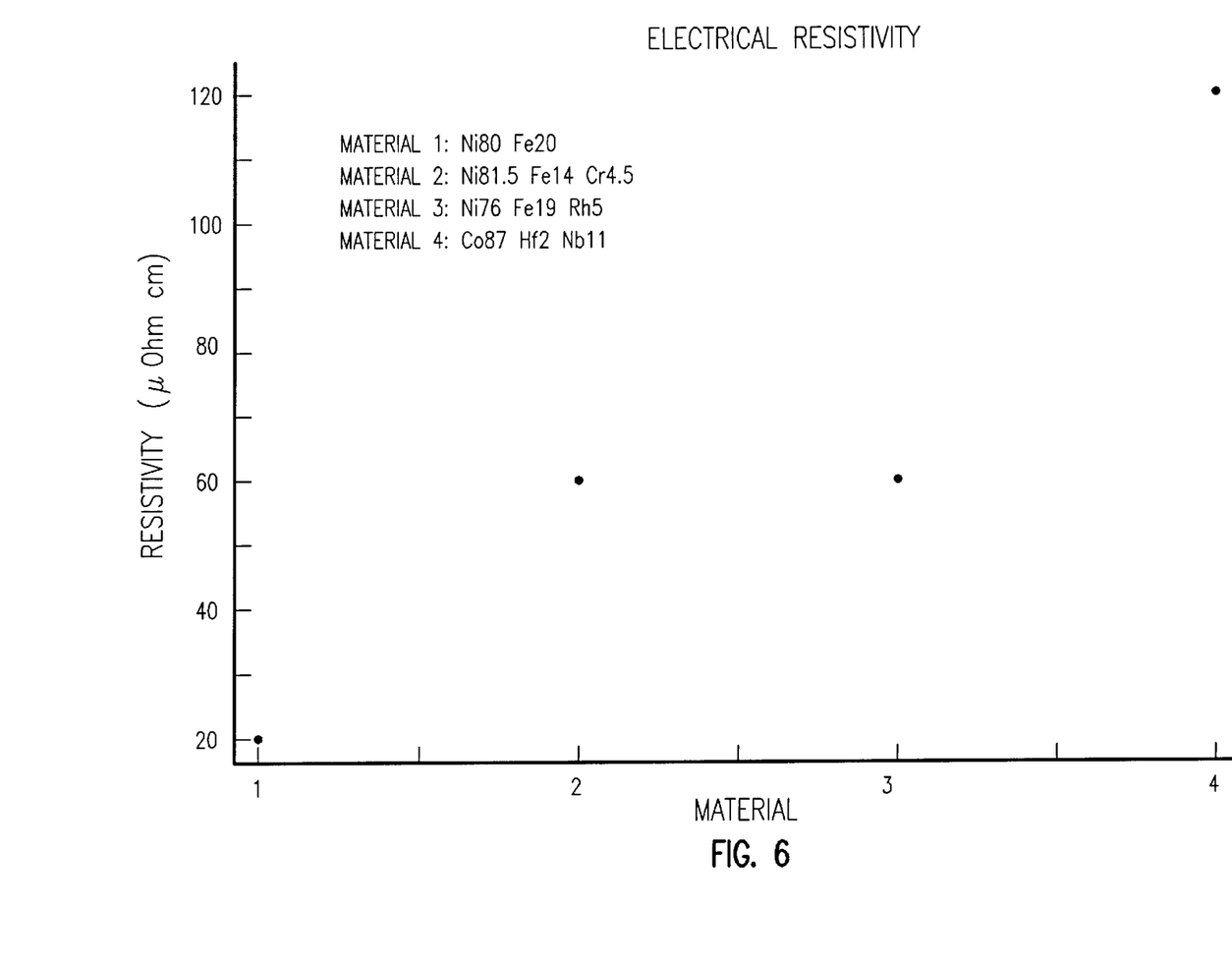
FIG. 6 is a graph illustrating the resistivity of the flux guide of the MR sensor of the present invention as well as the resistivity of the flux guide of the prior art references.

FIG. 6 shows the resistivity of four different materials used for making flux guides. The materials 1, 2 and 3 are conventional materials and material 4 is the high resistivity material disclosed by the present invention. It can readily be appreciated that the amorphous alloy of the present invention comprising $Co_{87}Hf_2Nb_{11}$ has a resistivity which is much larger than the resistivity of the conventional materials such as NiFe, NiFeRh, or NiFeCr.

Figure 7:
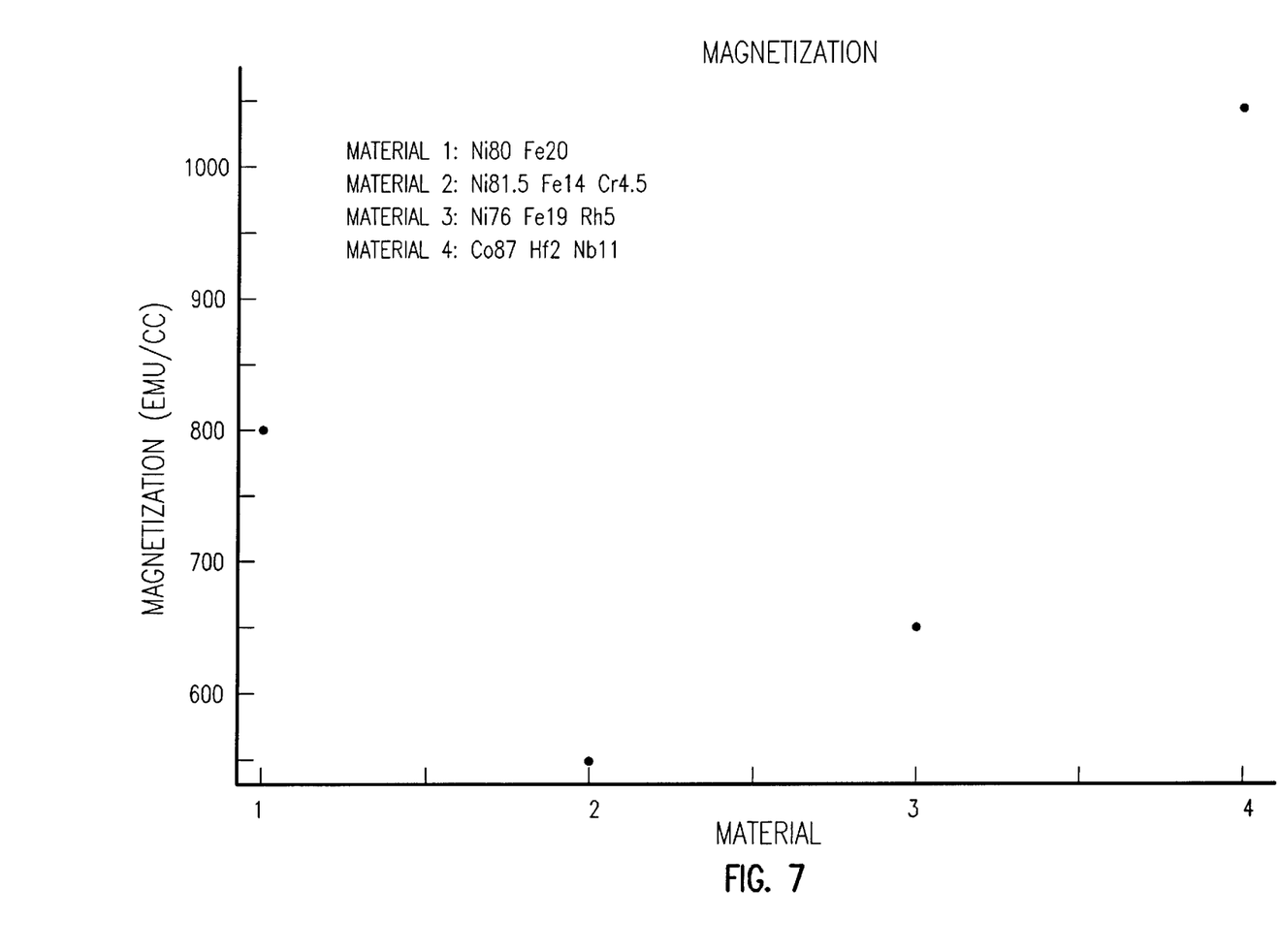
FIG. 7 is a graph illustrating the magnetization of the flux guide of the MR sensor of the present invention as well as the magnetization of the flux guide of the prior art references.

FIG. 7 shows the magnetization of four different materials used for making a flux guide where materials 1, 2 and 3 are conventional materials and material 4 is the high magnetization material, $Co_{87}Hf_2Nb_{11}$, disclosed by the present invention. It can readily be appreciated that the amorphous alloy of the present invention comprising $Co_{87}Hf_2Nb_{11}$ has a magnetization which is much larger than the magnetization of the conventional flux guide materials such as NiFe, NiFeRh, or NiFeCr.

Figure 8:
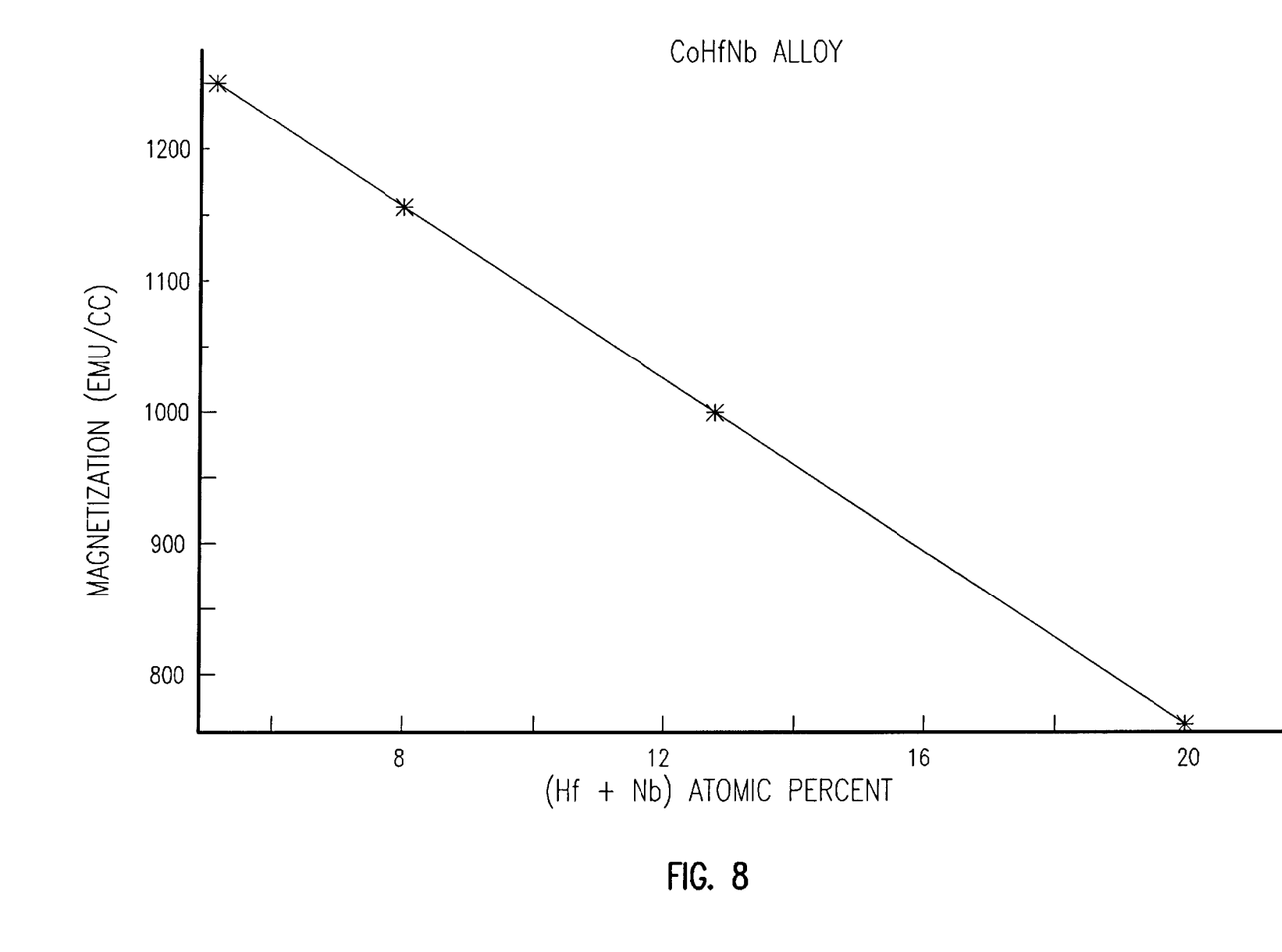
FIG. 8 is a graph illustrating the magnetization of the flux guide of the MR sensor of the present invention as a function of the percentage of (Hf+Nb); and, FIGS. 9A–9G show the specific steps of a process for fabricating the MR sensor of the present invention having a high resistivity flux guide.

FIG. 8 further shows the magnetization of the preferred material of the present invention as a function of the combined concentration of hafnium and niobium. When b+c=20 (b is the concentration of Hf and c is the concentration of Nb), the magnetization of $Co_aHf_bNb_c$ is about 800 emu/cm$^3$. When b+c=5, the magnetization $Co_aHf_bNb_c$ is about 1200 emu/cm$^3$. For b+c<5, the magnetization continues to increase, but the composition of $Co_aHf_bNb_c$ is no longer an amorphous alloy.

Figure 5:
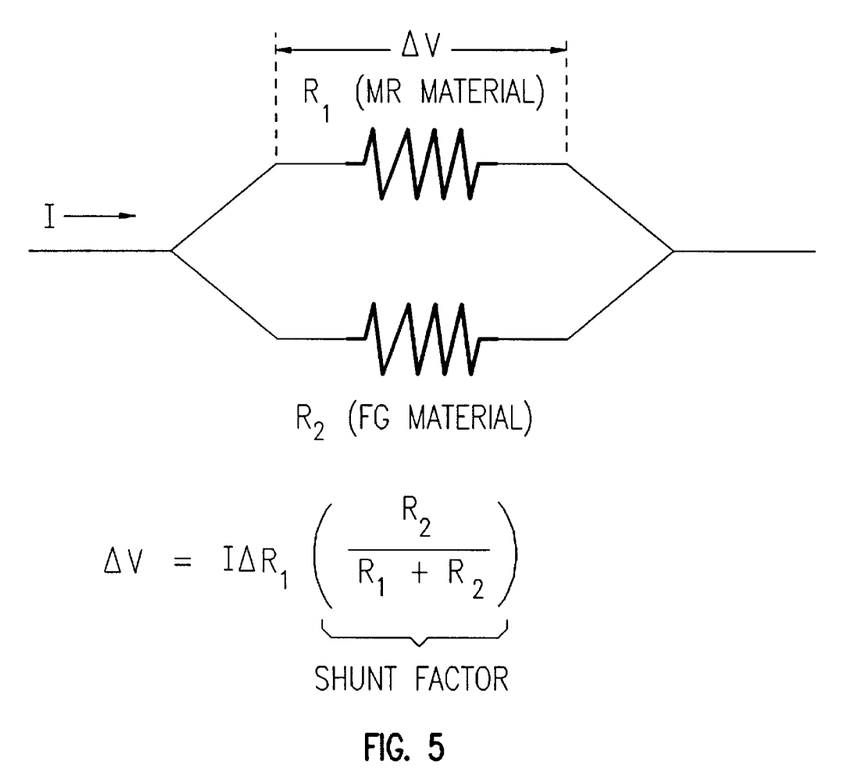
FIG. 5 is the equivalent electrical circuitry for an MR sensor sensing element in parallel with a flux guide.

With reference to FIG. 5, there is shown the electrical equivalent circuitry for an MR sensor sensing element in parallel with a flux guide. It can readily be shown that the shunt factor, the factor which is used to determine the amount of sense current actually flowing in the MR sensing element, can be calculated using the equation $R_2/R_1+R_2$, where $R_2$ is the resistance of flux guide material and $R_1$ is the resistance of the MR sensing element. The substantial improvement in shunt factor using the amorphous alloy material of the present invention is readily shown with the following typical example.

EXAMPLE

For a flux guide made of NiFe material having the resistivity $\rho=20$ $\mu\Omega$cm, magnetization of about 800 emu/cm$^3$, and thickness of about 250 Å, the sheet resistance can be shown to be about 8$\Omega$/□. For a flux guide comprising the amorphous alloy of the present invention comprising $Co_{87}Hf_2Nb_{11}$ having the resistivity $\rho=120$ $\mu\Omega$cm, magnetization of about 1035 emu/cm$^3$, and thickness of about 180 Å (lower thickness is possible because of higher magnetization), the sheet resistance can be shown to be about 66.6$\Omega$/58 . Furthermore, assume that the MR sensing element has a resistivity of about $\rho=56$ $\mu\Omega$cm, thickness of about 375 Å, and sheet resistance of about 15$\Omega$/□. Based on the above assumptions and calculations, the shunt factor for NiFe flux guide material can be shown to be equal to $(R_2/R_1+R_2)=8/15+8=0.348$ and the shunt factor for the flux guide material of the present invention comprising $Co_{87}Hf_2Nb_{11}$ can be shown to be equal to $(R_2/R_1+R_2)=66.6/15+66.6=0.816$. Comparing the shunt factors for NiFe and $Co_{87}Hf_2Nb_{11}$ together, it can readily be appreciated that, by using a flux guide made of NiFe, only 34.8% of the sense current flows in the sensing element and more than 65.2% of the sense current is shunted through the flux guide. In contrast, by using a flux guide made of $Co_{87}Hf_2Nb_{11}$, over 81.6% of the sense current flows in the sensing element and only 18.4% of the sense current is shunted through the flux guide.

With reference to FIGS. 9A–9G, there is shown an example of the preferred method of manufacturing of an MR sensor (spin valve MR sensor and anisotropic MR sensor) having a high resistivity flux guide comprising the preferred high resistivity material disclosed in the present invention. It is to be noted that the process steps for depositing a first shield (S1) over a substrate, depositing a first read gap (G1) over S1, and depositing the spin valve MR sensor layer over G1 will be omitted because they are known in the art.

Figure 9A:
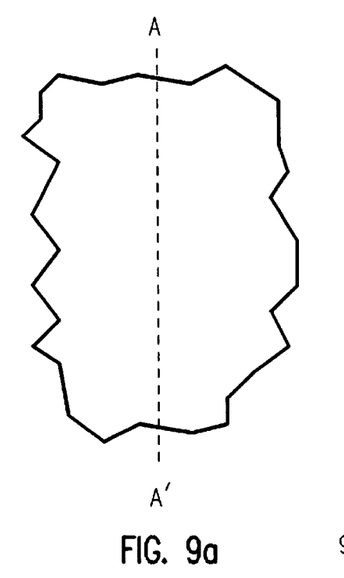
Figure 9B:
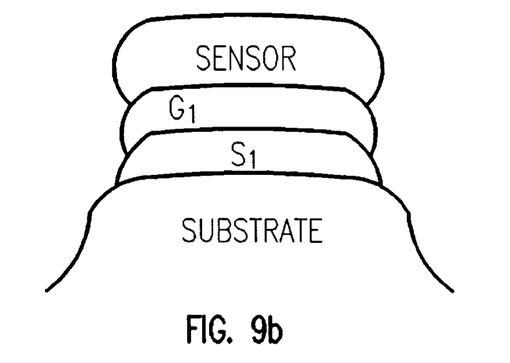
Figure 9C:
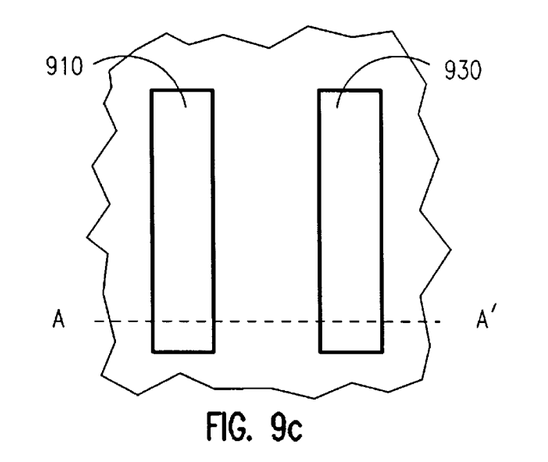
Figure 9D:
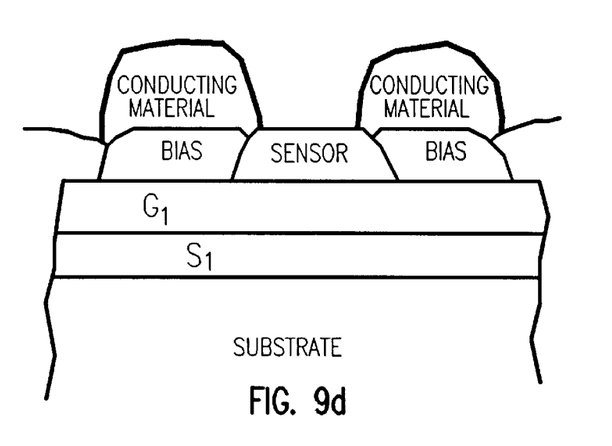

FIGS. 9A and 9B show the top view and the side view along the line AA', respectively, of a process step after the deposition of sensor layer over first read gap layer. Next, photoresist material is deposited over the sensor layer, patterned to define the sensor track width followed by developing the photoresist and removing sensor material in the areas that the photoresist has been developed. The sensor material is removed by, for example, ion beam milling or sputter etching. Next, the sensor's leads are formed by depositing bias material and conducting material in the areas where sensor material have been removed. FIGS. 9C and 9D show a top view and side view along the line AA', respectively, of a step in the process after the formation of the sensor's leads 910 and 930.

Next, photoresist material is deposited again, patterned and developed to define sensor element 920 and its edges (referred to is "stripe edges") 922 and 924. Sensor material is then removed, using ion beam milling or sputter etching, in the areas where the photoresist has been developed followed by deposition of the flux guide material $Co_{87}Hf_2Nb_{11}$ disclosed in the present invention. The remaining photoresist material is then dissolved with the flux guide material above the photoresist being removed or "lifted off", leaving only flux guide 940 in the region of the photoresist opening adjacent sensing element 920 of the MR sensor.

Figures 9E, 9F:
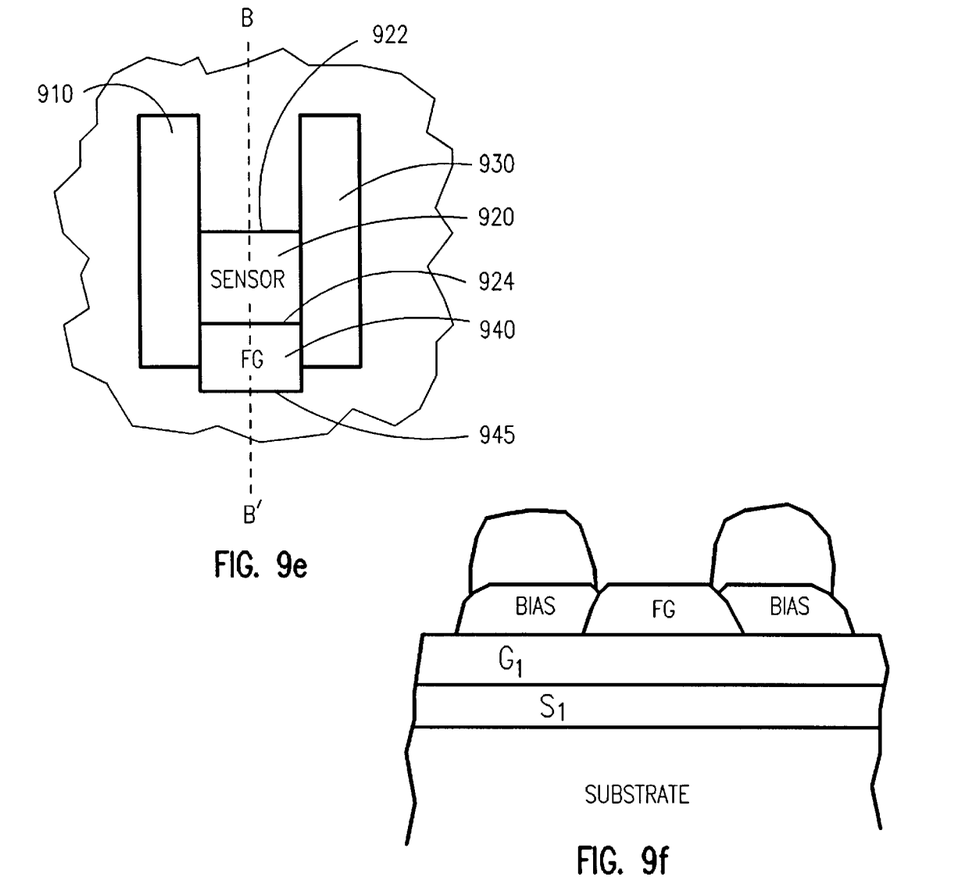
Figure 9G:
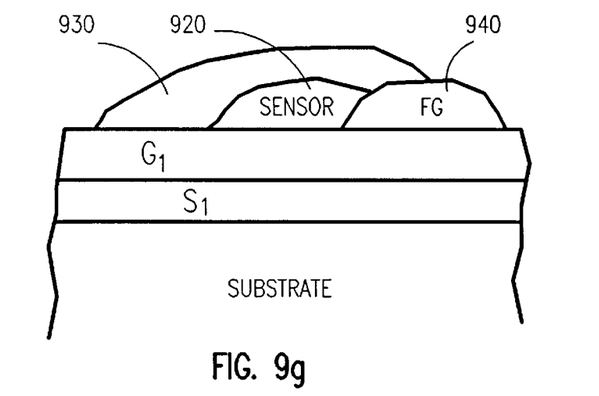

FIGS. 9E, 9F, and 9G show a top view, a front view as seen from the air bearing surface, and a side view along the line BB', respectively, after the formation of flux guide 940 in parallel and adjacent to sensing element 920 as described above. Flux guide 940 includes a track width edge 945. After the formation of flux guide 940, a second read gap layer and a second shield, as well as, the write head coils and second write pole are deposited and patterned, using known processing steps to form a complete read/write head.

In an alternative embodiment, flux guide 440, which is formed in parallel with MR sensing element 420, comprises an amorphous alloy having the composition $Co_{87}Fe_2Nb_{11}$. The pertinent magnetic and electrical properties of this material is summarized in Table 2. Table 2 also shows the magnetic and electrical property of NiFe for comparison.

TABLE 2

| | The Invention | Conventional Material |
|---|---|---|
| Flux guide composition | $Co_{87}Fe_2Nb_{11}$ | NiFe |
| P (resistivity, $\mu\Omega$ cm) | 120 | 20 |
| M (magnetization, emu/cm$^3$) | 1035 | 800 |
| Hc (coercivity, Oe) | 3 | 3 |

While the present invention has been particularly shown and described with reference to the preferred embodiment thereof, nevertheless, it will be understood by those skilled in the art that various modifications may be made therein without departing from the spirit, scope, and teaching of the present invention. For example, although, the preferred embodiment of the present invention was described in terms of a spin valve MR sensor having a high resistivity flux guide, the invention is equally applicable to an anisotropic MR sensor having a high resistivity flux guide. Accordingly, it is to be understood that the invention disclosed herein is not to be limited by the illustrated embodiments, but only by the scope of the appended claims.

I claim:

1. A magnetoresistive sensor having an air bearing surface, comprising:
    a magnetoresistive (MR) sensing element;
    first and second leads for providing sense current to said MR sensing element; and
    a flux guide positioned between said MR sensing element and the air bearing surface, said flux guide electrically shunting said magnetoresistive sensing element by causing a portion of the sense current to flow in said flux guide, said flux guide being composed of an amorphous alloy having the following composition: $Co_aHf_bNb_c$, where a is a Co concentration, b is an Hf concentration and c is an Nb concentration and wherein $80<a<96$, $4<b+c<20$, and $a+b+c=100$.

2. A magnetoresistive sensor according to claim 1, wherein a=87, b=2, and c=11.

3. A magnetoresistive sensor according to claim 1, wherein a=95, b=2, and c=3.

4. A magnetoresistive sensor according to claim 1, wherein said flux guide is formed using a heating step of at most 200° C.

5. A magnetoresistive sensor according to claim 1, wherein said magnetoresistive sensor comprises a spin valve magnetoresistive sensor.

6. A magnetoresistive sensor according to claim 1, wherein said magnetoresistive sensor comprises an anisotropic magnetoresistive sensor.

7. A magnetoresistive sensor having an air bearing surface, comprising:
    a magnetoresistive (MR) sensing element;
    first and second leads for providing sense current to said MR sensing element; and
    a flux guide positioned between said MR sensing element and the air bearing surface, said flux guide electrically shunting said magnetoresistive sensing element by causing a portion of the sense current to flow in said flux guide, said flux guide being composed of an amorphous alloy having the following composition: $Co_aFe_bNb_c$, where a is a Co concentration, b is an Fe concentration and c is an Nb concentration and wherein $80<a<96$, $4<b+c<20$, and $a+b+c=100$.

8. A magnetoresistive sensor according to claim 7, wherein a=87, b=2, and c=11.

9. A magnetoresistive sensor according to claim 7, wherein a=95, b=2, and c=3.

10. A magnetoresistive sensor according to claim 7, wherein said flux guide is formed using a heating step of at most 200° C.

11. A magnetoresistive sensor according to claim 7, wherein said magnetoresistive sensor comprises a spin valve magnetoresistive sensor.

12. A magnetoresistive sensor according to claim 7, wherein said magnetoresistive sensor comprises an anisotropic magnetoresistive sensor.

13. A magnetic storage system, comprising:
    a magnetic storage medium for recording data;
    a magnetoresistive (MR) sensor having an air bearing surface, said MR sensor in communication with said magnetic storage medium for reading said data, said MR sensor comprising:
    an MR sensing element;
    first and second leads for providing sense current to said MR sensing element; and
    a flux guide positioned between said MR sensing element and the air bearing surface, said flux guide electrically shunting said magnetoresistive sensing element by causing a portion of the sense current to flow in said flux guide, said flux guide being composed of an amorphous alloy having the following composition: $Co_aHf_bNb_c$, where a is a Co concentration, b is an Hf concentration and c is an Nb concentration and wherein $80<a<96$, $4<b+c<20$, and $a+b+c=100$; and,
    a recording channel coupled to said magnetoresistive sensor for detecting resistance changes in said magnetoresistive sensing element responsive to applied magnetic fields representative of data bits recorded in said magnetic storage medium.

14. A magnetic storage system according to claim 13, wherein a=87, b=2, and c=11.

15. A magnetic storage system according to claim 13, wherein a=95, b=2, and c=3.

16. A magnetic storage system according to claim 13, wherein said flux guide is formed using a heating step of at most 200° C.

17. A magnetic storage system according to claim 13, wherein said magnetoresistive sensor comprises a spin valve magnetoresistive sensor.

18. A magnetic storage system according to claim 13, wherein said magnetoresistive sensor comprises an anisotropic magnetoresistive sensor.

* * * * *